(12) United States Patent
Kurokawa (10) Patent No.: US 12,319,338 B2
(45) Date of Patent: Jun. 3, 2025

(54) STEERING DEVICE

(71) Applicant: NSK LTD., Tokyo (JP)

(72) Inventor: Yoshifumi Kurokawa, Gunma (JP)

(73) Assignee: NSK, LTD., Tokyo (JP)

( * ) Notice: Subject to any disclaimer, the term of this patent is extended or adjusted under 35 U.S.C. 154(b) by 0 days.

(21) Appl. No.: 18/515,596

(22) Filed: Nov. 21, 2023

(65) Prior Publication Data

US 2024/0157996 A1    May 16, 2024

Related U.S. Application Data (62) Division of application No. 17/286,025, filed as application No. PCT/JP2019/040750 on Oct. 16, 2019, now Pat. No. 11,891,114.

(51) Int. Cl.
  *B62D 1/187* (2006.01)
  *B62D 5/00* (2006.01)
  *B62D 5/04* (2006.01)

(52) U.S. Cl.
  CPC ............. *B62D 1/187* (2013.01); *B62D 5/006* (2013.01); *B62D 5/0481* (2013.01)

(58) Field of Classification Search
  CPC ...................................................... B62D 1/187
  See application file for complete search history.

(56) References Cited

FOREIGN PATENT DOCUMENTS

FR            3113021 A1  *  2/2022

* cited by examiner

*Primary Examiner* — Nicole T Verley
(74) *Attorney, Agent, or Firm* — Hartman Global IP Law; Gary M. Hartman; Domenica N. S. Hartman (57) ABSTRACT

A steering column has a cylindrical front-side column and a cylindrical rear-side column having a front-end portion that is connected to a rear-end portion of the front-side column. The steering shaft has a front-side shaft rotatably supported inside the front-side column, a rear-side shaft rotatably supported inside the rear-side column and has a rear-end portion to which the steering wheel is attached, and a universal joint connecting the rear-end portion of the front-side shaft and the front-end portion of the rear-side shaft. The front-end portion of the front-side column is always arranged above a portion of the extension line of the center axis of the rear-side column which exists at the same location in the front-rear direction as the front-end portion.

9 Claims, 11 Drawing Sheets

STEERING DEVICE

CROSS REFERENCE TO RELATED APPLICATIONS

This is a division patent application of co-pending U.S. patent application Ser. No. 17/286,025 filed Apr. 16, 2021, which claims the benefit of PCT/JP2019/040750 filed Oct. 16, 2019, having a priority claim to Japanese Patent Application No. 2018-197226 filed Oct. 19, 2018. The contents of these prior patent documents are incorporated herein by reference.

TECHNICAL FIELD

The present invention relates to a steering device for applying a steering angle to steered wheels of an automobile.

BACKGROUND ART

Figure 9:
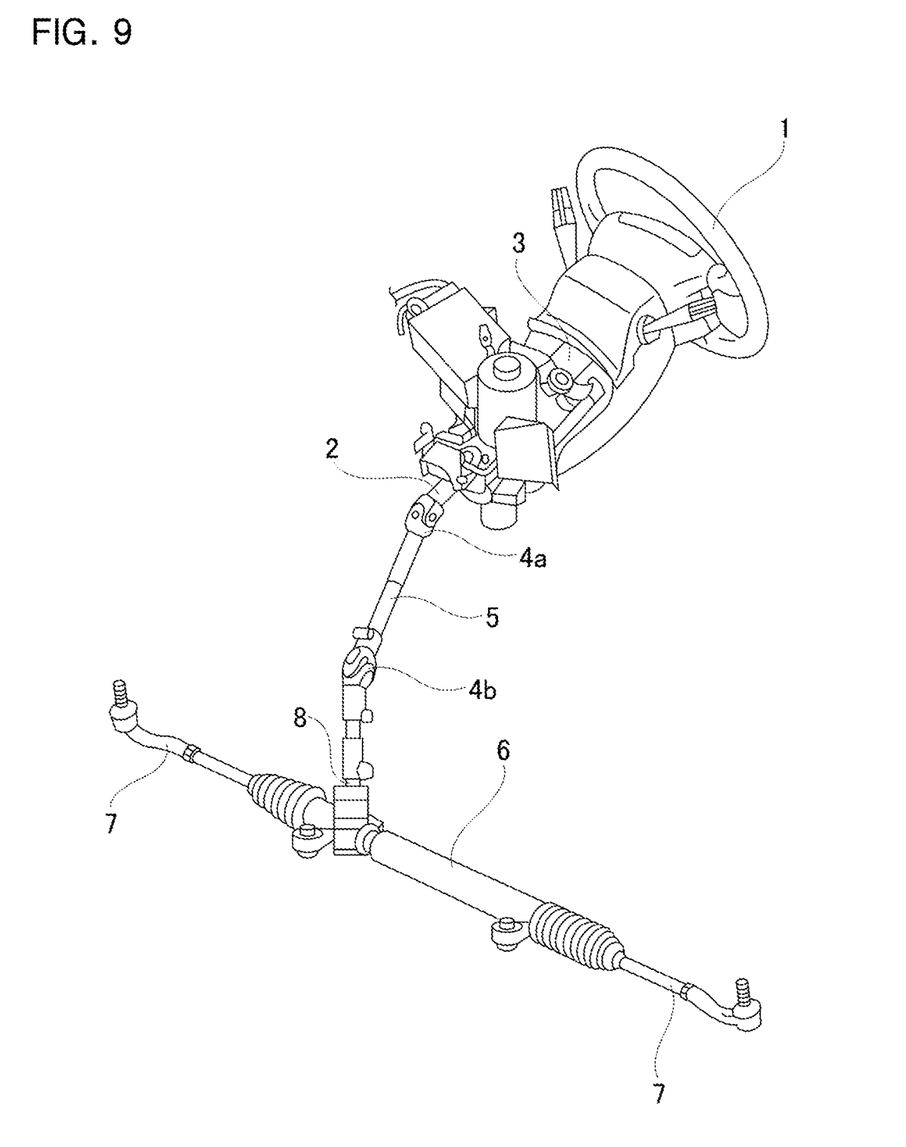
FIG. 9 is a perspective view illustrating an example of a conventional steering device.

FIG. 9 illustrates an example of a conventional steering device. The illustrated steering device comprises a steering wheel 1 operated by a driver, a steering shaft 2, a steering column 3, a pair of universal joints (cardan joints) 4a, 4b, an intermediate shaft 5, a rack and pinion steering gear unit 6, and a pair of tie rods 7.

In the following explanation, with respect to the steering device, the front-rear direction, the width direction, and the vertical direction are the front-rear direction, the width direction, and the vertical direction of the vehicle body to which the steering device is assembled.

The steering column 3 is formed into a cylindrical shape. The steering column 3 is arranged so as to incline downward going forward, and is supported with respect to the vehicle body. The steering shaft 2 is rotatably supported inside the steering column 3. The steering wheel 1 is supported by and fastened to the rear-end portion of the steering shaft. The front-end portion of the steering shaft 2 is connected to a pinion shaft 8 of the steering gear unit 6 via the pair of universal joints 4a, 4b and the intermediate shaft 5. By rotating the steering wheel 1, the pinion shaft 8 can be rotated. The rotation of the pinion shaft 8 is converted into a linear motion of a rack shaft (not illustrated) so as to push and pull the pair of tie rods 7. As a result, a steering angle is applied to a pair of steered wheels according to the amount of operation of the steering wheel 1.

The steering device of an automobile usually comprises a tilt mechanism that enables adjustment of the height position of the steering wheel in accordance with the size and operating posture of the driver. As a tilt mechanism, a swing type tilt mechanism that pivotally displaces only the rear-side portions of the steering shaft and the steering column when adjusting the height position of the steering wheel has been known (see, for example, JPH08-295246A, JP2000-085590A, JP2005-125926A, and JP2005-153879).

Figure 10:
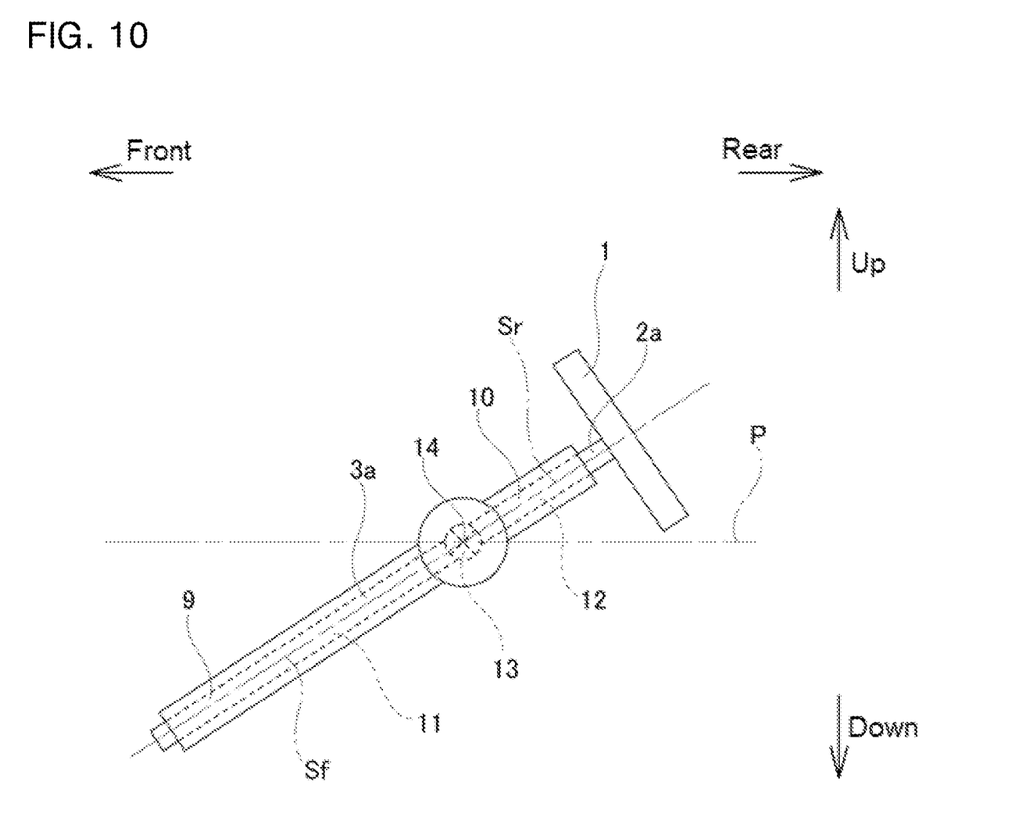
FIG. 10 is a side view that schematically represents part of a steering device comprising a conventional swing type tilt mechanism.

As illustrated in FIG. 10, in a steering device comprising a swing type tilt mechanism, the steering column 3a is divided into two, a cylindrical front-side column 9 which is supported by and fastened to the vehicle body, and a cylindrical rear-side column 10 which is arranged on the rear-side of the front-side column 9. The front-end portion of the rear-side column 10 is connected to the rear-end portion of the front-side column 9 so as to be able to pivotally move around the pivot shaft 14. The steering shaft 2a is also divided into two, a front-side shaft 11 which is rotatably supported inside the front-side column 9, and a rear-side shaft 12 which is rotatably supported inside the rear-side column 10. The rear-end portion of the front-side shaft 11 and the front-end portion of the rear-side shaft 12 are connected by a universal joint (cardan joint) 13 so as to be able to pivotally move and transmit torque.

Figure 11A:
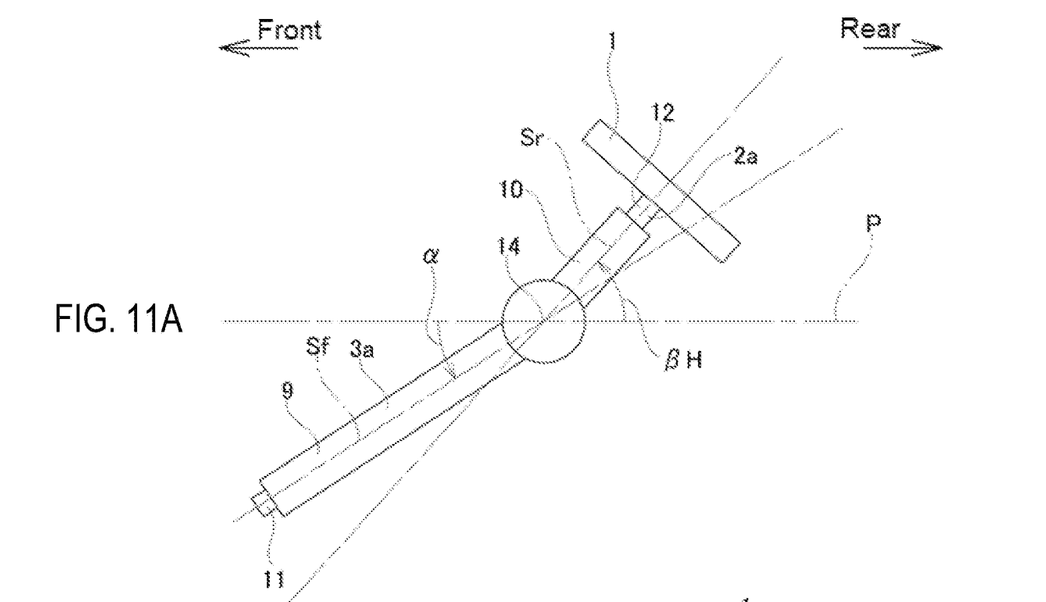
FIG. 11A is a view of the steering device illustrated in FIG. 10 in which the height position of the steering wheel exists at the upper end position of the adjustable range.
Figure 11B:
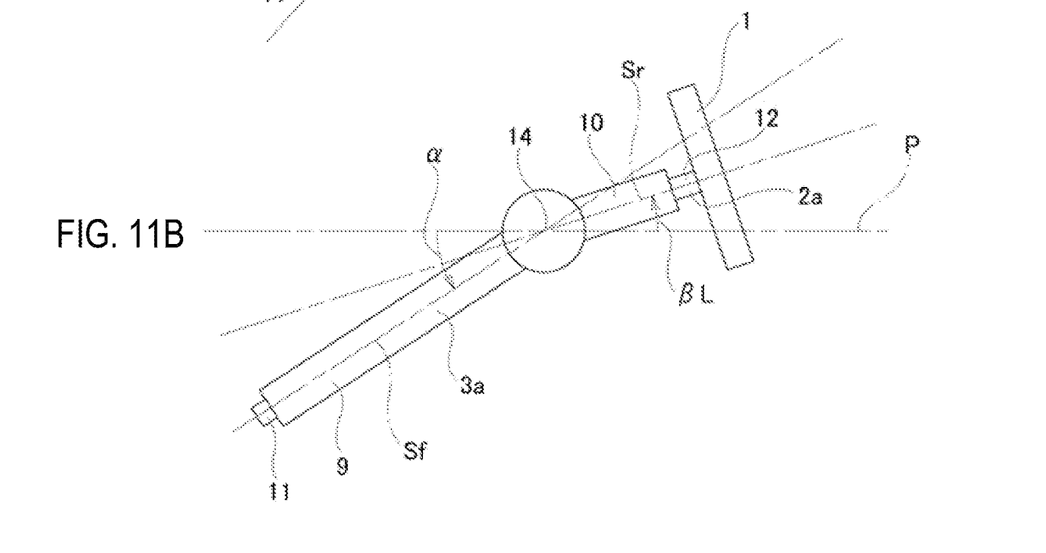
FIG. 11B is a view of the steering device illustrated in FIG. 10 in which the height position of the steering wheel exists at the lower end position of the adjustable range.

The range in which the rear-side column 10 (rear-side shaft 12) can pivotally displace with respect to the front-side column 9 (front-side shaft 11) is regulated to a predetermined range. The height position of the steering wheel 1 can be adjusted in this predetermined range. FIG. 11A illustrates a case where the height position of the steering wheel 1 is set to the upper end position in the adjustable range. In this case, the inclination angle of the center axis Sr of the rear-side column 10 with respect to the horizontal plane P is $\beta$H. FIG. 11B illustrates a case where the height position of the steering wheel 1 is set to the lower end position in the adjustable range. In this case, the inclination angle of the center axis Sr of the rear-side column 10 with respect to the horizontal plane P is $\beta$L.

SUMMARY OF INVENTION

Technical Problem

In a steering device comprising the conventional swing type tilt mechanism, there is room for improvement from the view point of making the foot space of the driver's seat wider in the vertical direction. This will be explained below.

In a steering device comprising the conventional swing type tilt mechanism, a front-side column 9 supported by and fastened to the vehicle body is arranged so as to incline downward going forward, and an inclination angle $\alpha$ of the center axis Sf of the front-side column 9 with respect to the horizontal plane P is set to be relatively large. Specifically, as illustrated in FIG. 11B, the inclination angle $\alpha$ of the center axis Sf of the front-side column 9 with respect to the horizontal plane P is set to be larger than the inclination angle $\beta$L of the center axis Sr of the rear-side column 10 with respect to the horizontal plane P ($\alpha > \beta$L) when the height position of the steering wheel 1 exists at the lower end position in the adjustable range. At least in this case, the front-end portion of the front-side column 9 is arranged below a portion of the extension line of the center axis Sr of the rear-side column 10 which exists at the same location in the front-rear direction as the front-end portion of the front-side column 9.

In a steering device comprising the conventional swing type tilt mechanism, the center axis Sf of the front-side column 9 is inclined at a relatively large inclination angle $\alpha$ so that the foot space of the driver's seat becomes narrower in the vertical direction going forward. Therefore, there is room for improvement from the view point of making the foot space of the driver's seat wider in the vertical direction.

An object of the present invention is to achieve a structure of a steering device in which the foot space of the driver's seat can be secured widely in the vertical direction.

Solution to Problem

The steering device of an aspect of the present invention includes a steering column, and a steering shaft which is rotatably supported inside the steering column.

The steering column has a cylindrical front-side column which is supported by and fastened to a vehicle body, and a cylindrical rear-side column arranged on the rear side of the front-side column and having a front-end portion which is connected to a rear-end portion of the front-side column.

The steering shaft has a front-side shaft which is rotatably supported inside the front-side column, a rear-side shaft which is rotatably supported inside the rear-side column and has a rear-end portion where a steering wheel is supported by and fastened to, and a universal joint that connects the rear-end portion of the front-side shaft and the front-end portion of the rear-side shaft.

The center axis of the rear-side column is arranged so as to incline downward going forward with respect to the horizontal plane.

The front-end portion of the front-side column is always arranged above a portion of the extension line of the center axis of the rear-side column which exists at the same location in the front-rear direction as the front-end portion of the front-side column.

The center axis of the front-side column can be arranged so as to be parallel with respect to the horizontal plane.

The center axis of the front-side column can be arranged so as to incline upward going forward with respect to the horizontal plane.

The front-end portion of the rear-side column can be connected with respect to the rear-end portion of the front-side column so as to be able to pivotally move around a pivot shaft which extends in the width direction. In this case, in a predetermined range where pivotal displacement of the rear-side column is possible between the swing position where the rear-side column exists at the upper end and the swing position where the rear-side column exists at the lower end with respect to the front-side column, the height position of the steering wheel can be adjusted based on pivotally moving the rear-side column with respect to the front-side column. In the steering device of an aspect of the present invention, in such a configuration, the front-end portion of the front-side column is arranged above a portion of the extension line of the center axis of the rear-side column which exists at the same location in the front-rear direction as the front-end portion of the front-side column even at the swing position where the rear-side column exists at the lower end.

The steering device of an aspect of the present invention may comprise an electric assist device that is configured to include the steering shaft and is arranged in part of a steering force transmission path that is continuous from the steering wheel to the steered wheels, and inputs an auxiliary power for reducing the operating force of the steering wheel. In this case, the electric assist device can be controlled so as to offset at least part of the fluctuations in the angular velocity and torque of rotation transmitted by the universal joint.

The steering device of an aspect of the present invention can be applied to a steering device with a steer-by-wire system which comprises a steering-side device to which the steering wheel is attached, and a turning-side device for applying a steering angle to a pair of steered wheels, in which the steering-side device and the turning-side device are electrically connected. In this case, the steering device of an aspect of the present invention can comprise an electric reaction force applying device which applies a reverse torque, which is an operation reaction force of the steering wheel, to the front-side shaft. In this case, the electric reaction force applying device can be controlled so as to offset at least part of the fluctuations in the angular velocity and torque of the rotation transmitted by the universal joints by the reverse torque.

Alternatively, the steering device of an aspect of the present invention can comprise an electric reaction force applying device which applies a reverse torque, which is an operation reaction force of the steering wheel, to the rear-side shaft.

Advantageous Effect of Invention

With the steering device of an aspect of the present invention, it becomes possible to secure the foot space of the driver's seat widely in the vertical direction.

DESCRIPTION OF EMBODIMENTS

First Example

Figure 1:
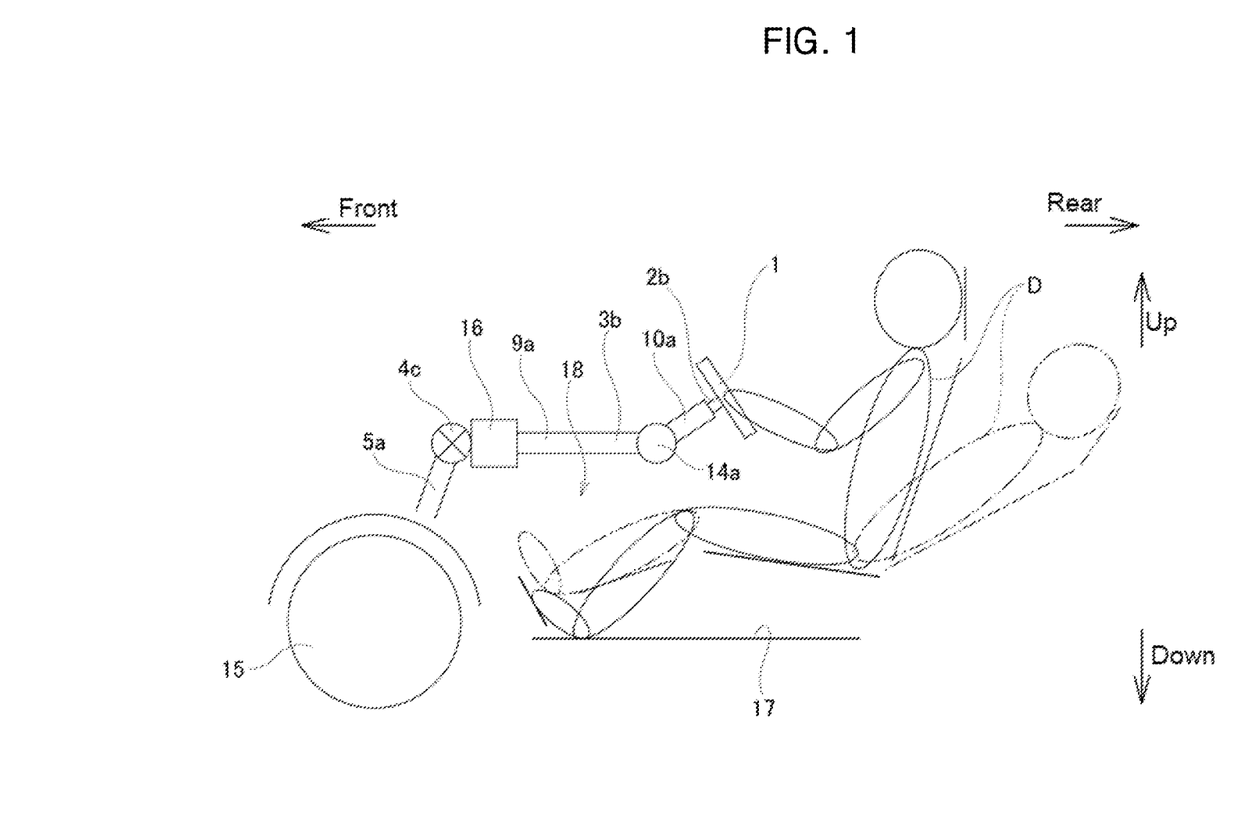
FIG. 1 is a side view that schematically represents a driver's seat and its peripheral portion of a vehicle to which a steering device according to a first example of an embodiment of the present invention is assembled.
Figure 2:
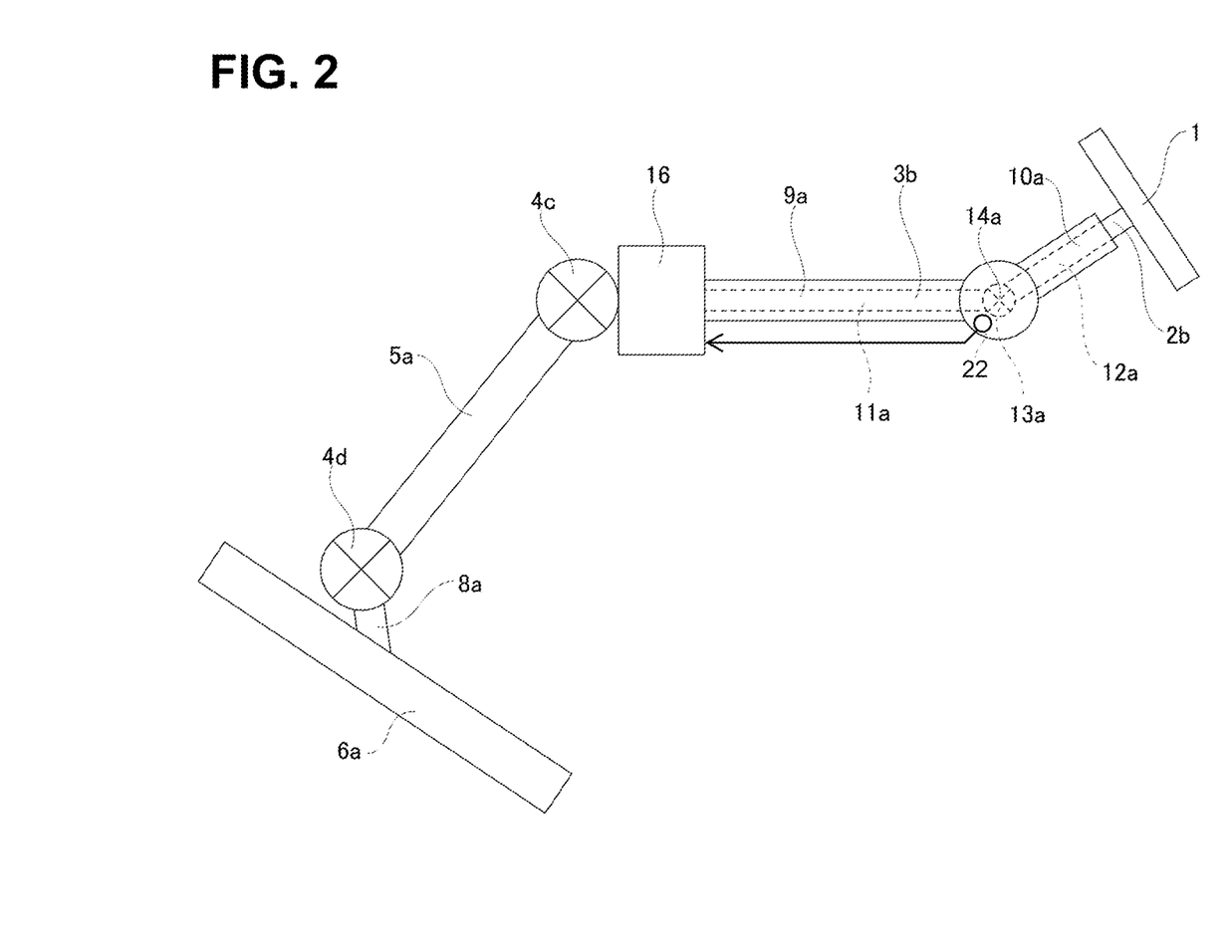
FIG. 2 is a schematic view of the steering device of the first example in a state that the steering device is assembled to the vehicle.

A first example of an embodiment of the present invention will be described with reference to FIGS. 1 to 3.

The steering device of this example comprises a steering shaft $2b$ and a steering column $3b$. The steering device of this example further comprises a front-side universal joint $4c$ and a rear-side universal joint $4d$ that configure a pair of universal joints (cardan joints), an intermediate shaft $5a$, a rack and pinion steering gear unit $6a$, and an electric assist device 16.

A steering wheel 1 operated by driver D is supported by and fastened to the rear-end portion of the steering shaft $2b$.

The steering shaft 2b is rotatably supported inside the steering column 3b supported by the vehicle body. The front-end portion of the steering shaft 2b is connected to a pinion shaft 8a of the steering gear unit 6a via the electric assist device 16, the rear-side universal joint 4c, the intermediate shaft 5, and the front-side universal joint 4d. By rotating the steering wheel 1, the pinion shaft 8a can be rotated. The rotation of the pinion shaft 8a is converted into a linear motion of a rack shaft (not illustrated) so as to push and pull a pair of tie rods 7 (see FIG. 9). As a result, a steering angle is applied to a pair of steered wheels 15 according to the amount of operation of the steering wheel 1.

The electric assist device 16 is configured to include the steering shaft 2b, and is arranged between the front-end portion of the steering shaft 2b and the rear-side universal joint 4c, which is part of a steering force transmission path from the steering wheel 1 to the steered wheels 15. The electric assist device 16 comprises an electric motor which becomes a power source, a reducer such as a worm reducer, an output shaft connected to the front-end portion of the steering shaft 2b by way of a torsion bar and connected to the rear-side universal joint 4c, a torque sensor, and a control portion. The electric assist device 16 detects the direction and magnitude of a torque input from the steering wheel 1 to the steering shaft 2b by a torque sensor. The control portion drives the electric motor according to the direction and magnitude of the detected torque, vehicle speed signal, and so on. Auxiliary power obtained by increasing the torque generated by the electric motor by the reducer is applied to the output shaft. Due to this, the rear-side universal joint 4c rotates with a torque which is greater than the torque input from the steering wheel 1 to the steering shaft 2b. As a result, the steering force, which is the force required to operate the steering wheel 1, is reduced.

The steering device of this example comprises a swing type tilt mechanism to enable adjustment of the height position of the steering wheel 1.

The steering column 3b has a cylindrical front-side column 9a arranged on the front side and a cylindrical rear-side column 10a arranged on the rear side. The front-end portion of the rear-side column 10a is connected to the rear-end portion of the front-side column 9a so as to be able to pivotally move around the pivot shaft 14a which extends in the width direction. The front-side column 9a is arranged horizontally by matching the axial direction of the front-side column 9a with the front-rear direction, and the front-side column 9a is supported by and fastened to the vehicle body by using a column fastening member such as a support bracket (not illustrated). In other words, the front-side column 9a is arranged so as to be parallel to the floor surface 17 of the vehicle room, which is a horizontal plane, in a state of being supported by and fastened to the vehicle body. The electric assist device 16 is supported by and fastened to the front-end portion of the front-side column 9a.

Figure 3A:
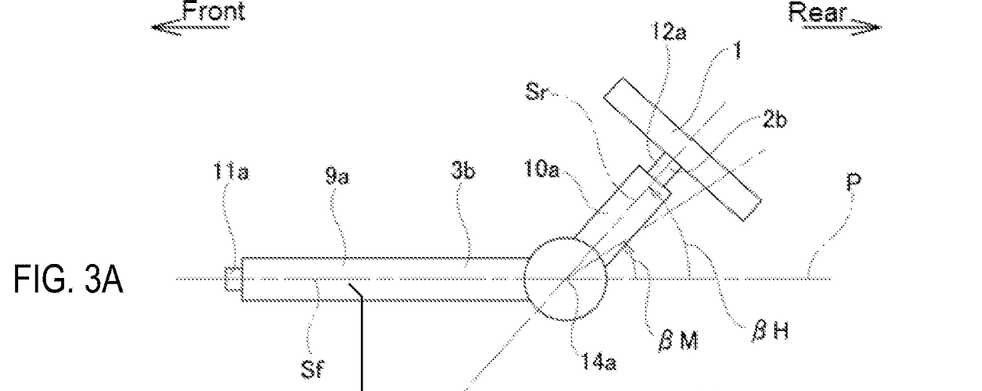
FIG. 3A is a view of the right half of the steering device illustrated in FIG. 2 in which the height position exists at the upper end position of the adjustable range.
Figure 3B:
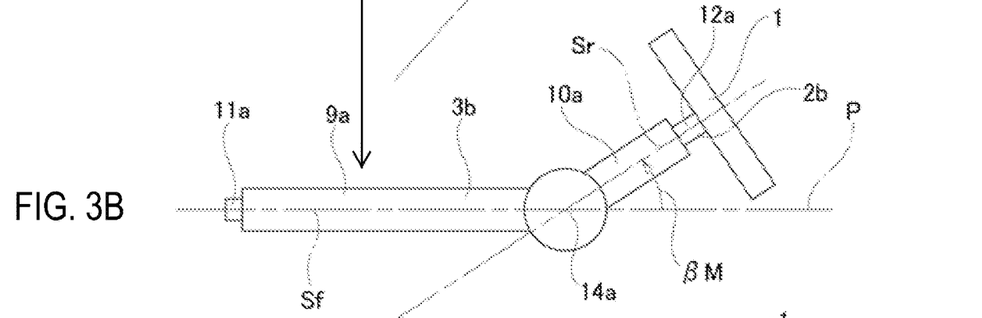
FIG. 3B is a view of the right half of the steering device illustrated in FIG. 2 in which the height position exists at the central position of the adjustable range.
Figure 3C:
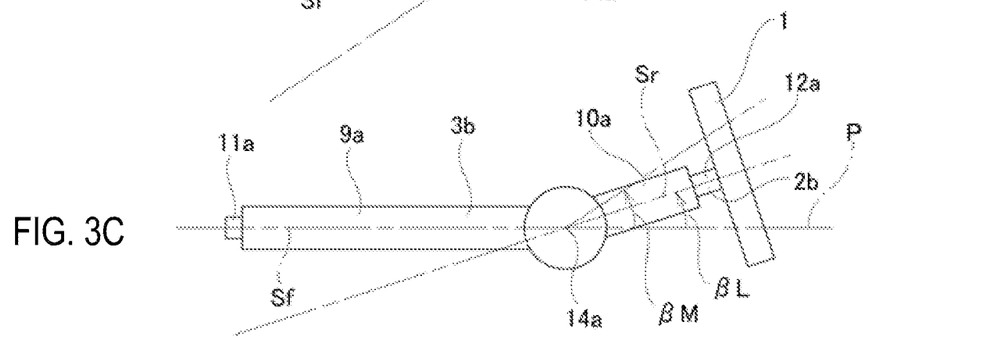
FIG. 3C is a view of the right half of the steering device illustrated in FIG. 2 in which the height position exists at the lower end position of the adjustable range.

The range in which the rear-side column 10a can pivotally displace with respect to the front-side column 9a is regulated to be a predetermined range, which is the range between FIG. 3A to FIG. 3C, by a regulating means (not illustrated). The rear-side column 10a is arranged so as to always incline downward going forward at any swing position in this predetermined range. The inclination angle of the center axis Sr of the rear-side column 10a with respect to the horizontal plane P (center axis Sf of the front-side column 9a) is $\beta H$ at the swing position at the upper end illustrated in FIG. 3A, $\beta L$ at the swing position at the lower end illustrated in FIG. 3C, and $\beta M\{=(\beta H+\beta L)/2\}$ at the swing position at the center illustrated in FIG. 3B.

In this example, since the front-side column 9a is arranged horizontally, the front-end portion of the front-side column 9a is always arranged above the portion of the extension line of the center axis Sr of the rear-side column 10a which exists at the same location in the front-rear direction as the front-end portion of the front-side column 9a.

The steering shaft 2b has a front-side shaft 11a arranged on the front side, a rear-side shaft 12a arranged on the rear side, and a universal joint (cardan joint) 13a which connects the rear-end portion of the front-side shaft 11a and the front-end portion of the rear-side shaft 12a so as to be able to pivotally move and transmit torque. The front-side shaft 11a is rotatably supported inside the front-side column 9a by a rolling bearing (not illustrated). In this state, the front-side shaft 11a is arranged coaxially with the front-side column 9a. The rear-side shaft 12a is rotatably supported inside the rear-side column 10a by a rolling bearing (not illustrated). In this state, the rear-side shaft 12a is arranged coaxially with the rear-side column 10a. The swing center of the universal joint 13a exists on the center axis of the pivot shaft 14a. As a result, swing of the rear-side column 10a with respect to the front-side column 9a and swing of the rear-side shaft 12a with respect to the front-side shaft 11a are smoothly performed in synchronization with each other.

The height position of the steering wheel 1 can be adjusted in the predetermined range, which is the range in which the rear-side column 10a can pivotally displace with respect to the front-side column 9a. That is, FIG. 3A illustrates a state in which the height position of the steering wheel 1 is set to the upper end position of the adjustable range, FIG. 3C illustrates a state in which the height position of the steering wheel 1 is set to the lower end position in the adjustable range, and FIG. 3B illustrates a state in which the height position of the steering wheel 1 is set to the central position of the adjustable range.

The steering device of this example comprises a lock mechanism (not illustrated). With the lock mechanism, it is possible to switch between a state in which the height position of the steering wheel 1 can be adjusted by enabling pivotal displacement of the rear-side column 10a with respect to the front-side column 9a and a state in which the height position of the steering wheel 1 is held at the adjusted position by disabling pivotal displacement of the rear-side column 10a with respect to the front-side column 9a.

In the steering device of the present example, since the front-side column 9a (front-side shaft 11a) is arranged horizontally, the joint angle of the universal joint 13a, which is the inclination angle of the center axis of the rear-side shaft 12a with respect to the center axis of the front-side shaft 11a, may be large depending on the height position of the steering wheel 1. On the other hand, in a state where the universal joint 13a has a joint angle, the angular velocity and torque of rotation transmitted by the universal joint 13a fluctuate. Further, the degree of fluctuation in this angular velocity and torque increases as the joint angle of the universal joint 13a becomes larger. Therefore, when the joint angle of the universal joint 13a becomes large due to the height position of the steering wheel 1, the fluctuation in the angular velocity and torque of rotation transmitted from the rear-side shaft 12a to the front-side shaft 11a increases. Such fluctuations are transmitted to the steering wheel 1 as a reaction, which may give a sense of discomfort to the driver D who operates this steering wheel 1. For example, when the driver D operates the steering wheel 1 with constant torque, it may give the driver D a sense of discomfort that the angular velocity of the steering wheel 1 fluctuates, or when the driver D operates the steering wheel 1 at a constant angular velocity, it may give the driver D a sense of discomfort that the torque required to operate the steering wheel 1 fluctuates.

In this example, in order not to give the driver D who operates the steering wheel 1 a sense of discomfort, at least part (preferably all) of the fluctuations in the angular velocity and torque of rotation transmitted by the universal joint 13*a* are offset by the auxiliary torque generated by the electric assist device 16.

The angular velocity and torque transmitted by the universal joint 13*a* change depending on the rotational position of the universal joint 13*a* (angle of rotation of a yoke). The relationship between the angular velocity and torque of rotation transmitted by the universal joint 13*a* and the rotational position of the universal joint 13*a* differs depending on the joint angle of the universal joint 13*a*.

In this example, the relationship for each joint angle of the universal joint 13*a*, which has been studied in advance, is stored in the control portion of the electric assist device 16 in the form of a mathematical formula or a map. Further, a sensor 22 for detecting the joint angle of the universal joint 13*a* and the rotational position of the universal joint 13*a* is provided, and the value detected by the sensor 22 is input to the control portion of the electric assist device 16. When necessary, at least one of the angular velocity, the angular acceleration, and the torque transmitted by the universal joint 13*a* detected by the torque sensor or the like included in the electric assist device 16 is input to the control portion of the electric assist device 16. By utilizing each value detected as described above and the relationship stored as described above, the control portion of the electric assist device 16 obtains fluctuations in the angular velocity and torque of rotation transmitted by the universal joint 13*a* and generates an auxiliary torque that offsets the obtained fluctuation.

As a sensor 22 for detecting the joint angle of the universal joint 13*a*, in addition to a sensor that directly detects the joint angle of the universal joint 13*a*, for example, it is possible to use a sensor that detects the inclination angle (column position) of the rear-side column 10*a* and the height position of the steering wheel 1, which is an amount equivalent to the joint angle of the universal joint 13*a*. As these sensors, for example, a displacement sensor can be used. When calculating the joint angle of the universal joint 13*a* by using the detected values of these sensors, for example, it is possible to use a standard value (nominal value, etc.) of a preset joint angle (inclination angle of the rear-side column 10*a*, height position of the steering wheel 1).

As a sensor 22 for detecting the rotational position of the universal joint 13*a*, in addition to a sensor that directly detects the rotational position of the universal joint 13*a*, for example, it is possible to use a sensor that detects the rotational position (angle of rotation) of the front-side shaft 11*a*, the rear-side shaft 12*a*, or the steering wheel 1, which is an amount equivalent to the rotational position of the universal joint 13*a*.

In this example, the angular velocity and torque of rotation transmitted by each of the pair of universal joints 4*c*, 4*d* existing on both sides of the intermediate shaft 5*a* also fluctuate. However, in this example, the assembly phases of the universal joints 4*c*, 4*d* in the rotational direction are shifted from each other so that the fluctuations are offset between the universal joints 4*c*, 4*d*.

In the structure of this example, however, since the front-side column 9*a* is arranged horizontally, the intermediate shaft 5*a* becomes long. Therefore, there is a possibility that the fluctuations in the angular velocity and torque of rotation transmitted by each of the universal joints 4*c*, 4*d* cannot be offset between the universal joints 4*c*, 4*d* just by shifting the assembly phases in the rotational direction of the universal joints 4*c*, 4*d*. In the case of embodying the structure of this example, it is also possible to control the electric assist device 16 so as to offset the fluctuations in the angular velocity and torque of rotation transmitted by each of the universal joints 4*c*, 4*d* by the auxiliary torque in a manner similar to the fluctuations in the angular velocity and torque of rotation transmitted by the universal joint 13*a*.

In the steering device of the present example, the front-side column 9*a* is arranged horizontally. Therefore, the steering device of the present example can secure the foot space 18 of the driver's seat widely in the vertical direction, compared to the structure illustrated in FIG. 11A and FIG. 11B in which the front-side column 9 supported by and fastened to the vehicle body is arranged so as to incline downward going forward and the inclination angle α of the center axis Sf of the front-side column 9 with respect to the horizontal plane P is set to be relatively large.

In other words, in the steering device of the present example, as illustrated in FIG. 3A to FIG. 3C, the front-end portion of the front-side column 9*a* is always arranged above the portion of the extension line of the center axis Sr of the rear-side column 10*a* which exists at the same location in the front-rear direction as the front-end portion of the front-side column 9*a*, regardless of the swing position of the rear-side column 10*a*. That is, in the predetermined range in which the rear-side column 10*a* can pivotally displace with respect to the front-side column 9*a*, even when the rear-side column 10*a* exists at the lower end swing position illustrated in FIG. 3C, the front-end portion of the front-side column 9*a* is arranged above the portion of the extension line of the center axis Sr of the rear-side column 10*a* which exists at the same location in the front-rear direction as the front-end portion of the front-side column 9*a*. Therefore, at least when the height position of the steering wheel 1 illustrated in FIG. 11B is set to the lower end position in the adjustable range, compared to a conventional structure in which the front-end portion of the front-side column 9 is arranged lower than the portion of the extension line of the center axis Sr of the rear-side column 10 which exists at the same location in the front-rear direction as the front-end portion of the front-side column 9, the steering device of the present example can secure the foot space 18 of the driver's seat widely in the vertical direction. Accordingly, the comfortability in the driver's seat can be improved by that amount.

Second Example

Figure 4A:
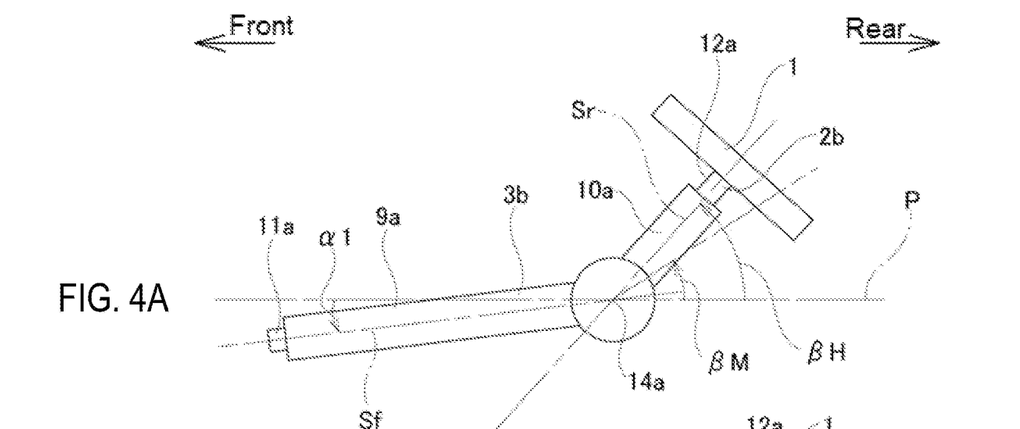
FIG. 4A to FIG. 4C are views with respect to a second example of an embodiment of the present invention, corresponding to FIG. 3A to FIG. 3C.
Figures 4B, 4C:
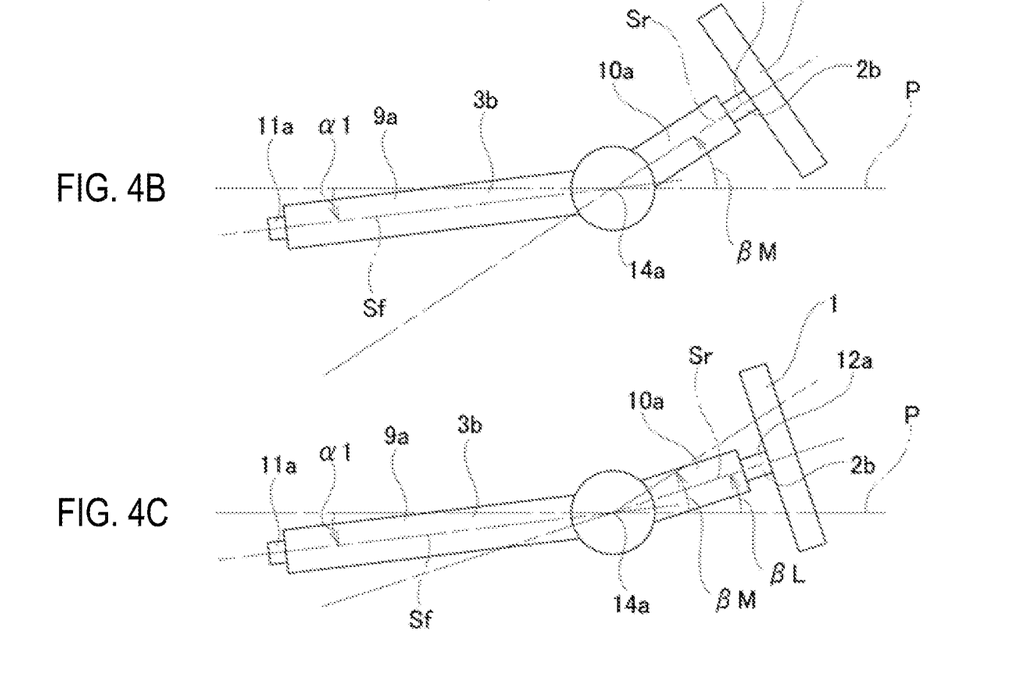

A second example of an embodiment of the present invention will be described with reference to FIG. 4A to FIG. 4C. In this example, the front-side column 9*a* is arranged so as to incline downward going forward in a state of being supported by and fastened to the vehicle body. However, in this example, the inclination angle α1 (gradient) of the center axis Sf of the front-side column 9*a* with respect to the horizontal plane P is, as illustrated in FIG. 4C, set to be smaller than the inclination angle βL (gradient) of the center axis Sr of the rear-side column 10*a* with respect to the horizontal plane P when the height position of the steering wheel 1 exists at the lower end position in the adjustable range (α1<βL). Therefore, in this example as well, the front-end portion of the front-side column 9a is always arranged above the portion of the extension line of the center axis Sr of the rear-side column 10a which exists at the same location in the front-rear direction as the front-end portion of the front-side column 9a, regardless of the swing position of the rear-side column 10.

The steering device of the present example can secure the foot space 18 of the driver's seat (see FIG. 1) widely in the vertical direction, compared to the conventional structure illustrated in FIG. 11A and FIG. 11B. In the case of embodying the structure of this example, from the view point of widely securing the foot space 18 of the driver's seat in the vertical direction, the inclination angle α1 of the center axis Sf of the front-side column 9a with respect to the horizontal plane P is preferably set to 30 degrees or less. Other configurations and operational effects are the same as in the first example.

Third Example

Figure 5A:
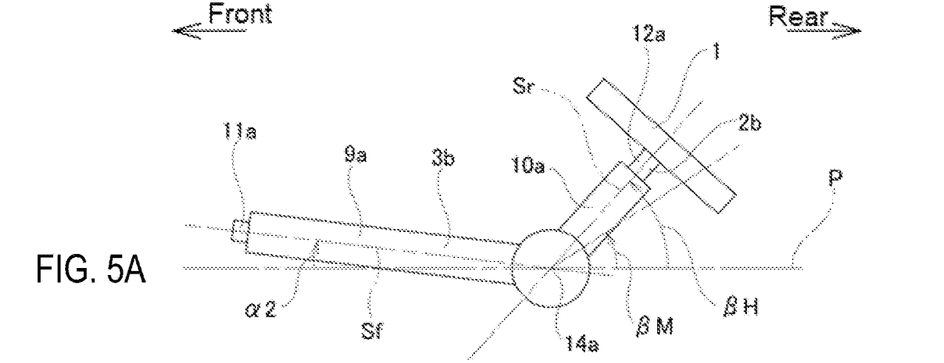
FIG. 5A to FIG. 5C are views with respect to a third example of an embodiment of the present invention, corresponding to FIG. 3A to FIG. 3C.
Figure 5B:
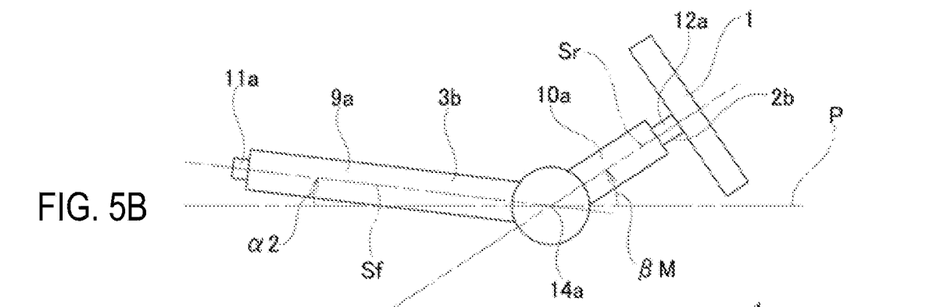
Figure 5C:
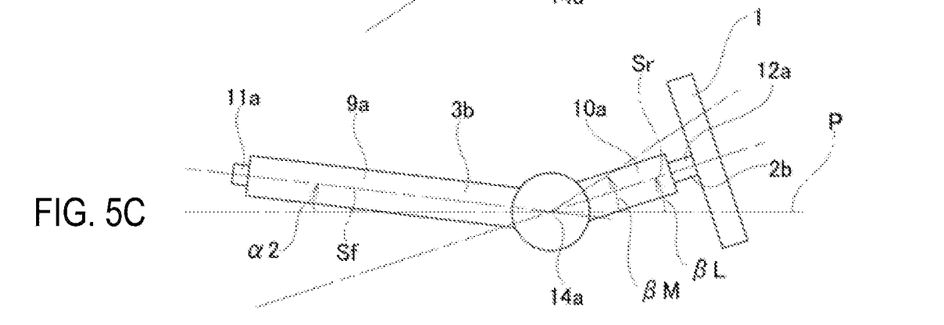

A third example of an embodiment of the present invention will be described with reference to FIG. 5A to FIG. 5C. In this example, the front-side column 9a is arranged so as to incline upward going forward in a state of being supported by and fastened to the vehicle body. That is, the front-side column 9a is inclined upward going forward as compared with the horizontal plane P. In this example as well, the front-end portion of the front-side column 9a is always arranged above the portion of the extension line of the center axis Sr of the rear-side column 10a which exists at the same location in the front-rear direction as the front-end portion of the front-side column 9a regardless of the swing position of the rear-side column 10.

In the steering device of the present example, the foot space 18 of the driver's seat (see FIG. 1) can be secured widely in the vertical direction compared to the conventional structure illustrated in FIG. 10, FIG. 11A, and FIG. 11B. In the case of embodying the structure of this example, from the view point of achieving a practical layout such as reducing the length of the intermediate shaft 5a, the inclination angle α2 of the center axis Sf of the front-side column 9a with respect to the horizontal plane P is preferably set to 25 degrees or less. Other configurations and operational effects are the same as in the first example.

Fourth Example

Figure 6:
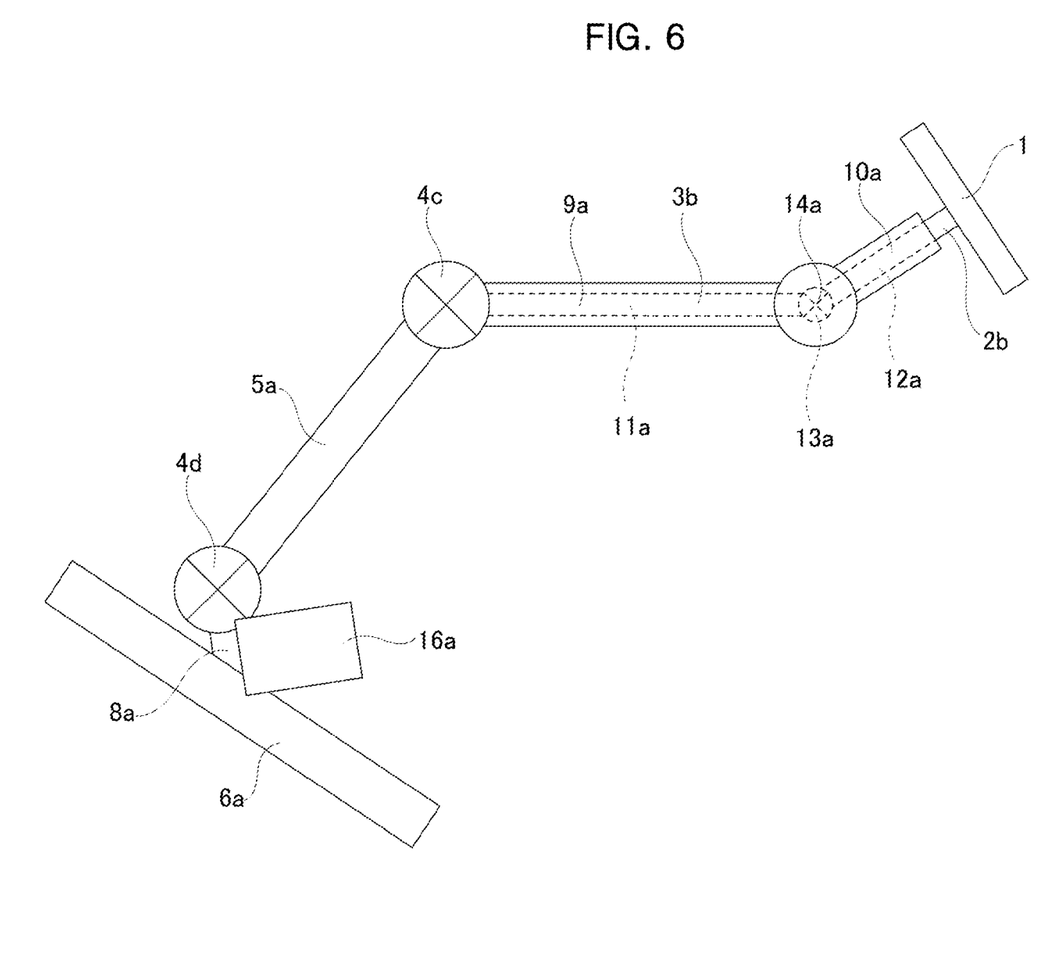
FIG. 6 is a view similar to FIG. 2, with respect to a fourth example of an embodiment of the present invention.

A fourth example of an embodiment of the present invention will be described with reference to FIG. 6. In this example, the installation location of the electric assist device 16a is different from the first example. In this example, the electric assist device 16a includes the steering shaft 2b, and is provided between the front-side universal joint 4d and the pinion shaft 8a, which are part of the steering force transmission path from the steering wheel 1 to the steered wheels 15 (see FIG. 1). That is, the front-side universal joint 4d and the pinion shaft 8a are connected via this electric assist device 16a. In this example, the front-end portion of the front-side shaft 11a is directly connected to the rear-side universal joint 4c. Similar to the electric assist device 16 of the first example, the electric assist device 16a applies an auxiliary torque to the pinion shaft 8a, and is controlled so as to generate an auxiliary torque that offsets the fluctuations in the angular velocity and torque of rotation transmitted by the universal joint 13a. Other configurations and operational effects are the same as in the first example.

Fifth Example

Figure 7:
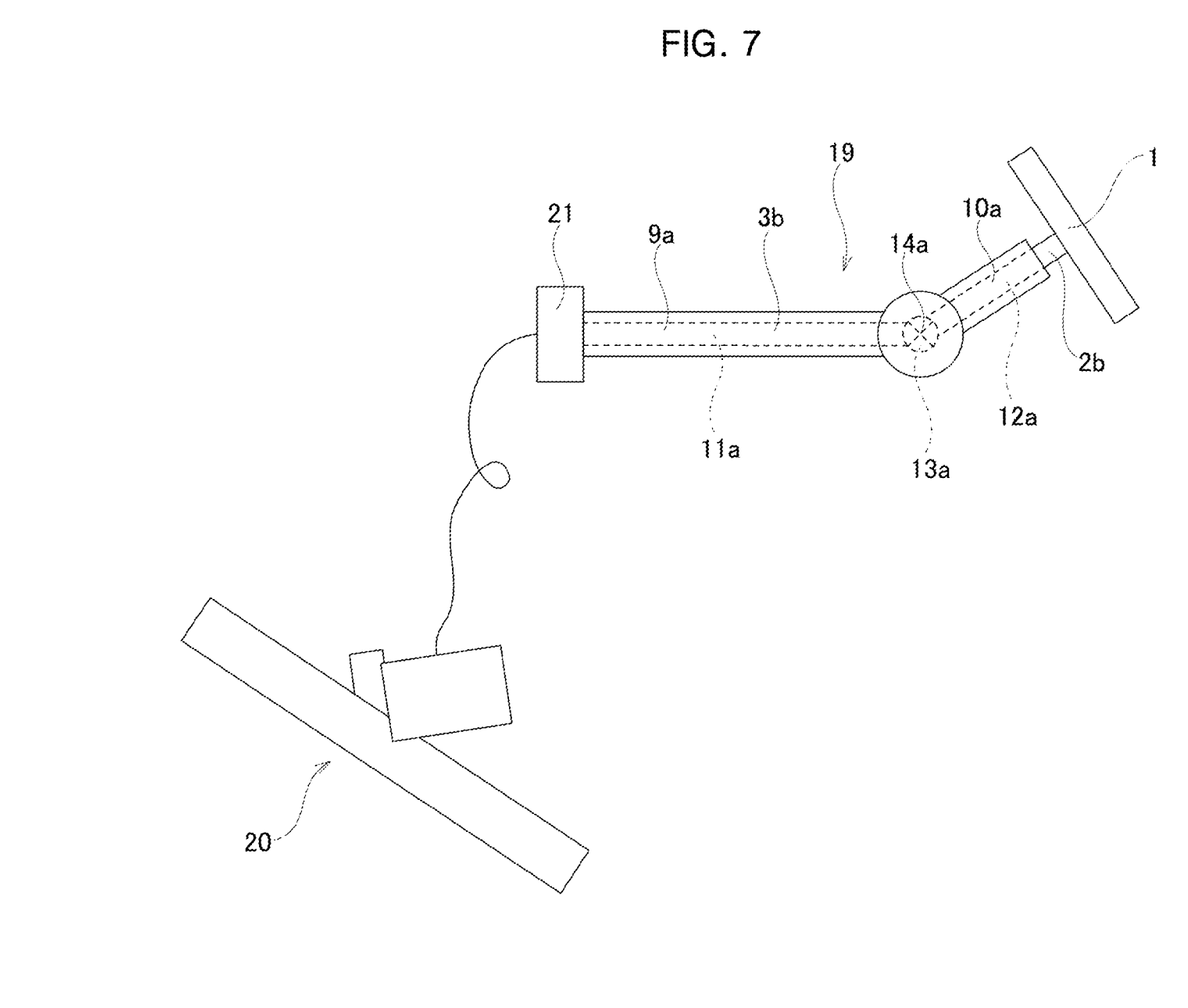
FIG. 7 is a view similar to FIG. 2, with respect to a fifth example of an embodiment of the present invention.

A fifth example of an embodiment of the present invention will be described with reference to FIG. 7. The steering device of this example is composed of a steering device with steer-by-wire system. The steering device with steer-by-wire system comprises a steering-side device 19 to which the steering wheel 1 is attached, and a turning-side device 20 for applying a steering angle to a pair of steered wheels 15 (see FIG. 1). The steering-side device 19 and the turning-side device 20 are electrically connected. In the steering device with steer-by-wire system, the amount of operation of the steering wheel 1 is detected by a sensor, and a steering angle is applied to the pair of steered wheels 15 by driving an actuator of the turning-side device 20 based on the output signal of the sensor.

The steering-side device 19 of this example comprises a steering shaft 2b and a steering column 3b that configure the steering device. The steering-side device of this example further comprises an electric reaction force applying device 21. In this example as well, the front-side column 9a which configures the steering column 3b is arranged horizontally in a state of being supported by and fastened to the vehicle body. the electric reaction force applying device 21 is supported by the front-end portion of the front-side column 9a.

The electric reaction force applying device 21 has an electric motor which becomes a power source and a reducer, and drives the electric motor as the driver D operates the steering wheel 1. The torque of the electric motor is increased by the reducer and then transmitted to the front-side shaft 11a as a reverse torque, which is the torque in the direction opposite to the direction of rotation of the steering wheel 1. As a result, an operation reaction force based on the reverse torque is applied to the steering wheel 1. The magnitude of the operation reaction force applied to the steering wheel 1 is basically determined according to the rotational position of the steering wheel 1, the torque input from the steering wheel 1 to the steering shaft 2b, and so on, which are respectively obtained by the sensor.

In this example, similar to the electric assist device 16 of the first example, the electric reaction force applying device 21 is controlled so as to offset the fluctuations in the angular velocity and torque of rotation transmitted by the universal joint 13a by the reverse torque transmitted from the electric reaction force applying device 21 to the front-side shaft 11a.

The front-side column 9a is arranged horizontally in the steering device of this example with steer-by-wire system as well, so the foot space 18 of the driver's seat (see FIG. 1) can be secured widely in the vertical direction. Other configurations and operational effects are the same as in the first example.

Sixth Example

Figure 8:
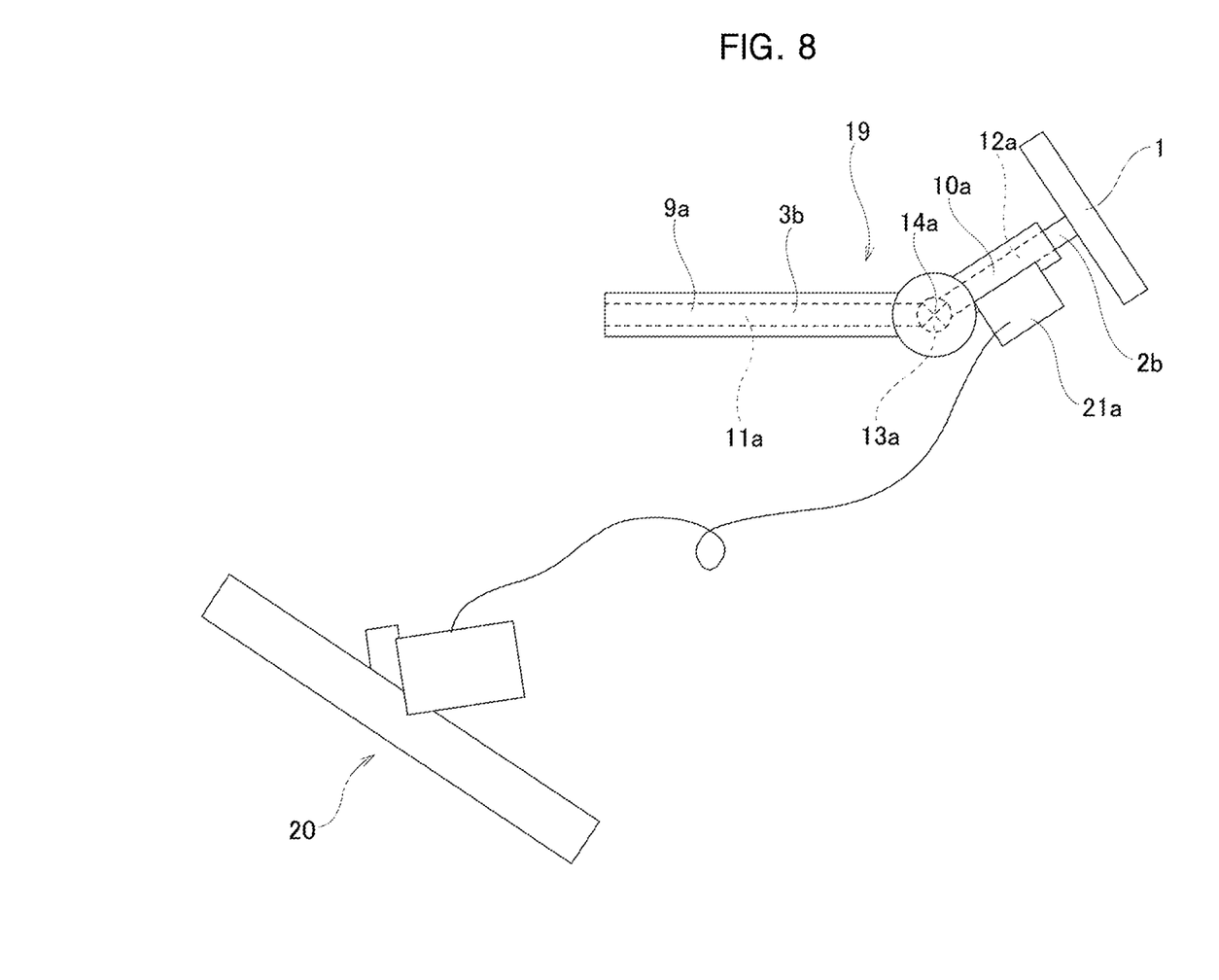
FIG. 8 is a view similar to FIG. 2, with respect to a sixth example of an embodiment of the present invention.

A sixth example of an embodiment of the present invention will be described with reference to FIG. 8. In this example, the installation location of the electric reaction force applying device 21a is different from the fifth example. In this example, the electric reaction force applying device 21a is supported by the rear-side column 10a of the steering column 3b. The electric reaction force applying device 21a increases the torque of the electric motor by the reducer and transmits the torque to the rear-side shaft 12a. As a result, the operation reaction force based on the torque is applied to the steering wheel 1.

In this example, the torque (operation reaction force) applied from the electric reaction force applying device 21a to the steering shaft 2b is input to the rear-side shaft 12a located on the side closer to the steering wheel 1 than the universal joints 13a. Therefore, the fluctuations in the angular velocity and torque of rotation transmitted by the universal joint 13a are not required to be offset by the torque input from the electric reaction force applying device 21a to the rear-side shaft 12a. In this example, the front-side column 9a and the front-side shaft 11a can be utilized as an installation location of a sensor to detect the amount of operation of the steering wheel 1. Other configurations and operational effects are the same as in the first example and the fifth example.

The structure of each example of an embodiment of the present invention may be appropriately combined and implemented as long as no contradiction occurs. For example, regarding the structures of the fourth to sixth examples as well, similar to the second example or the third example, it is possible to adopt a structure in which the front-side column is inclined with respect to the horizontal plane in a state where the front-side column is supported by and fastened to the vehicle body.

The present invention can be applied to a structure in which the inclination angle of the center axis of the rear-side column with respect to the horizontal plane is kept constant, that is, a steering device with a structure without a tilt function that allows adjustment of the height position of the steering wheel.

In the steering device of the present invention, the structures described in JPH08-295246A, JP2000-085590A, JP2005-125926A, JP 2005-153879A, and so on can be adopted as more specific structures regarding the steering shaft, the steering column, and the lock mechanism.

The present invention can be applied to a steering device with a structure that further comprises a function of adjusting the front-rear position of the steering wheel, and a steering device with a structure that further comprises a function that can electrically adjust the position of the steering wheel, which are described in JP 2005-153879A and so on.

REFERENCE SIGNS LIST

1 Steering wheel
2, 2a, 2b Steering shaft
3, 3a, 3b Steering column
4a-4d Universal joints
5, 5a Intermediate shaft
6, 6a Steering gear unit
7 Tie rod
8, 8a Pinion shaft
9, 9a Front-side column
10, 10a Rear-side column
11, 11a Front-side shaft
12, 12a Rear-side shaft
13, 13a Universal joints
14, 14a Pivot shaft
15 Steered wheel
16, 16a Electric assist device
17 Floor surface
18 Foot space of the driver's seat
19 Steering-side device
20 Turning-side device
21, 21a Electric reaction force applying device

The invention claimed is:

1. A steering device comprising:
a steering column; and
a steering shaft rotatably supported inside the steering column;
wherein:
the steering column has a cylindrical front-side column supported by and fastened to a vehicle body, and a cylindrical rear-side column arranged on a rear side of the front-side column and having a front-end portion connected to a rear-end portion of the front-side column,
the steering shaft has a front-side shaft rotatably supported inside the front-side column, a rear-side shaft rotatably supported inside the rear-side column and having a rear-end portion where a steering wheel is supported by and fastened to, and a universal joint connecting a rear-end portion of the front-side shaft and a front-end portion of the rear-side shaft, wherein the front-side column and the front-side shaft each have a fixed length,
a center axis of the front-side column is arranged so as to incline upward going forward with respect to a horizontal plane, which corresponds to a floor surface of a vehicle room of the vehicle body in a state that the steering device is supported by and fastened to the vehicle body,
the rear-side column is arranged so that a center axis thereof inclines downward going forward with respect to the horizontal plane, and
the front-side column is arranged so that the front-end portion of the front-side column is always arranged above a portion of an extension line of the center axis of the rear-side column which exists at the same location in a front-rear direction as the front-end portion of the front-side column.

2. The steering device according to claim 1, wherein the front-end portion of the rear-side column is connected to the rear-end portion of the front-side column so as to be able to pivotally move around a pivot shaft which extends in a width direction, and a height position of the steering wheel can be adjusted based on pivotally moving the rear-side column with respect to the front-side column in a predetermined range in which the rear-side column can pivotally displace between a swing position where the rear-side column exists at an upper end and a swing position where the rear-side column exists at a lower end with respect to the front-side column.

3. The steering device according to claim 2, wherein the front-end portion of the front-side column is arranged above the portion of the extension line of the center axis of the rear-side column which exists at the same location in the front-rear direction as the front-end portion of the front-side column even at the swing position where the rear-side column exists at the lower end.

4. The steering device according to claim 1, comprising an electric assist device that is configured to include the steering shaft and is arranged in part of a steering force transmission path that is continuous from the steering wheel to steered wheels, and inputs an auxiliary power for reducing an operating force of the steering wheel, wherein
the electric assist device is controlled so as to offset at least part of fluctuations in an angular velocity and torque of rotation transmitted by the universal joint by the auxiliary power.

5. A steering device comprising:

a steering column; and a steering shaft rotatably supported inside the steering column; wherein:

the steering column has a cylindrical front-side column supported by and fastened to a vehicle body, and a cylindrical rear-side column arranged on a rear side of the front-side column and having a front-end portion connected to a rear-end portion of the front-side column, the steering shaft has a front-side shaft rotatably supported inside the front-side column, a rear-side shaft rotatably supported inside the rear-side column and having a rear-end portion where a steering wheel is supported by and fastened to, and a universal joint connecting a rear-end portion of the front-side shaft and a front-end portion of the rear-side shaft, a center axis of the front-side column is arranged so as to incline upward going forward with respect to a horizontal plane, which corresponds to a floor surface of a vehicle room of the vehicle body in a state that the steering device is supported by and fastened to the vehicle body, the rear-side column is arranged so that a center axis thereof inclines downward going forward with respect to the horizontal plane, and the front-side column is arranged so that the front-end portion of the front-side column is always arranged above a portion of an extension line of the center axis of the rear-side column which exists at the same location in a front-rear direction as the front-end portion of the front-side column;

the steering device comprises a steer-by-wire system comprising a steering-side device to which the steering wheel is attached, and a turning-side device for applying a steering angle to a pair of steered wheels, in which the steering-side device and the turning-side device are electrically connected, the steering-side device includes the steering column and the steering shaft, the front-side shaft is provided with an electric reaction force applying device to apply a reverse torque, which becomes an operation reaction force of the steering wheel, to the front-side shaft, and the electric reaction force applying device is controlled so as to offset at least part of the fluctuations in an angular velocity and torque of rotation transmitted by the universal joint by the reverse torque.

6. The steering device according to claim 1, comprising a steering device with steer-by-wire system comprising a steering-side device to which a steering wheel is attached, and a turning-side device for applying a steering angle to a pair of steered wheels, in which the steering-side device and the turning-side device are electrically connected, wherein the steering-side device includes the steering column and the steering shaft, and the rear-side shaft is provided with an electric reaction force applying device to apply a reverse torque, which becomes an operation reaction force of the steering wheel, to the rear-side shaft.

7. The steering device according to claim 1, wherein a sensor for detecting a joint angle and a rotational speed of the universal joint is provided.

8. The steering device according to claim 1, wherein an electric assist device is provided, the electric assist device configured to include the steering shaft and arranged in part of a steering force transmission path that is continuous from the steering wheel to steered wheels, and inputting an auxiliary power for reducing an operating force of the steering wheel, the center axis of the front-side column is arranged so as to incline downward going forward with respect to the horizontal plane, and the electric assist device is arranged on a front side of the front-side column.

9. The steering device according to claim 1, wherein an inclination angle of the center axis of the front-side column with respect to the horizontal plane is set to 30 degrees or less.

* * * * *